(12) United States Patent
Kusafuka

(10) Patent No.: US 11,616,940 B2
(45) Date of Patent: Mar. 28, 2023

(54) THREE-DIMENSIONAL DISPLAY DEVICE, THREE-DIMENSIONAL DISPLAY SYSTEM, HEAD-UP DISPLAY, AND MOBILE OBJECT

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/291,103

(22) PCT Filed: Oct. 25, 2019

(86) PCT No.: PCT/JP2019/042032
§ 371 (c)(1),
(2) Date: May 4, 2021

(87) PCT Pub. No.: WO2020/095731
PCT Pub. Date: May 14, 2020

(65) Prior Publication Data
US 2021/0409676 A1     Dec. 30, 2021

(30) Foreign Application Priority Data
Nov. 5, 2018    (JP) .............................. JP2018-208415

(51) Int. Cl.
*H04N 13/344*      (2018.01)
*H04N 13/383*      (2018.01)
(Continued)

(52) U.S. Cl.
CPC ........... *H04N 13/344* (2018.05); *B60K 35/00* (2013.01); *G02B 27/0101* (2013.01);
(Continued)

(58) Field of Classification Search
CPC .. H04N 13/344; H04N 13/361; H04N 13/363; H04N 13/383; H04N 13/398;
(Continued)

(56) References Cited

U.S. PATENT DOCUMENTS 7,978,407 B1 * 7/2011 Connor .................. G02B 30/27
                                                     348/54
9,690,098 B1 * 6/2017 Kuo .................... G02B 27/0149
(Continued)

FOREIGN PATENT DOCUMENTS

| CN | 102566063 A | 7/2012 |
|---|---|---|
| CN | 103487963 A | 1/2014 |

(Continued)

*Primary Examiner* — Tung T Vo
(74) *Attorney, Agent, or Firm* — Studebaker & Brackett PC

(57) ABSTRACT

A display device includes: a display panel configured to display a parallax image including a first image to be viewed by a first eye of a user and a second image to be viewed by a second eye of the user; and an optical member including a plurality of optical elements arranged along a predetermined direction which includes a component in a parallax direction of the first eye and the second eye. A beam direction of the parallax image is defined by the plurality of optical elements. The display panel includes a plurality of subpixels including a plurality of minipixel. Each of the minipixels included in the plurality of subpixels is configured to be able to display different images.

10 Claims, 11 Drawing Sheets

(51) Int. Cl.
*H04N 13/361* (2018.01)
*H04N 13/363* (2018.01)
*H04N 13/398* (2018.01)
*G02B 30/32* (2020.01)
*G02B 30/31* (2020.01)
*B60K 35/00* (2006.01)
*G02B 27/01* (2006.01)

(52) U.S. Cl.
CPC ............. *G02B 30/31* (2020.01); *G02B 30/32* (2020.01); *H04N 13/361* (2018.05); *H04N 13/363* (2018.05); *H04N 13/383* (2018.05); *H04N 13/398* (2018.05); *B60K 2370/149* (2019.05); *B60K 2370/152* (2019.05); *G02B 2027/0134* (2013.01)

(58) Field of Classification Search
CPC ...... H04N 13/317; H04N 13/31; B60K 35/00; B60K 2370/149; B60K 2370/152; B60K 2370/1523; B60K 2370/1526; G02B 27/0101; G02B 30/31; G02B 30/32; G02B 2027/0134; G02B 27/01; G02B 30/00; G06F 3/147
USPC .......................................................... 348/53
See application file for complete search history.

(56) References Cited

U.S. PATENT DOCUMENTS

| | | | |
|---|---|---|---|
| 2006/0227208 A1* | 10/2006 | Saishu | H04N 13/31 348/51 |
| 2012/0032949 A1* | 2/2012 | Lim | H04N 13/337 345/419 |
| 2012/0147155 A1 | 6/2012 | Kashiwagi | |
| 2012/0194512 A1* | 8/2012 | Kim | H04N 13/398 345/419 |
| 2013/0114135 A1* | 5/2013 | Lin | H04N 13/31 359/464 |
| 2014/0340746 A1* | 11/2014 | Watanabe | G09G 3/003 359/464 |
| 2015/0091886 A1 | 4/2015 | Quan et al. | |
| 2015/0138246 A1* | 5/2015 | Lo | G09G 3/3607 345/690 |
| 2015/0362740 A1 | 12/2015 | Hamagishi et al. | |
| 2016/0050409 A1* | 2/2016 | Park | H04N 13/305 348/54 |
| 2016/0065954 A1* | 3/2016 | Son | G02B 30/52 348/51 |
| 2016/0073097 A1* | 3/2016 | Hamagishi | H04N 13/305 348/59 |
| 2016/0219260 A1 | 7/2016 | Sato et al. | |
| 2016/0323566 A1* | 11/2016 | Vdovin | G02B 30/27 |
| 2016/0349507 A1 | 12/2016 | Hayashi | |
| 2017/0045763 A1* | 2/2017 | Murao | G02F 1/137 |
| 2017/0155891 A1 | 6/2017 | Hu et al. | |
| 2017/0212359 A1* | 7/2017 | Kim | H04N 13/32 |
| 2018/0239152 A1* | 8/2018 | Kuo | G02B 27/0149 |
| 2018/0376134 A1* | 12/2018 | Koerber | H04N 13/383 |
| 2019/0058874 A1* | 2/2019 | Kim | G02B 30/30 |
| 2020/0355914 A1* | 11/2020 | Albesa | G02B 27/0101 |
| 2021/0055547 A1* | 2/2021 | Rao | G09G 3/3208 |

FOREIGN PATENT DOCUMENTS

| | | |
|---|---|---|
| CN | 105828060 A | 8/2016 |
| EP | 2648413 A2 | 10/2013 |
| JP | 2012-123325 A | 6/2012 |
| JP | 2015-072474 A | 4/2015 |
| JP | 2016-140056 A | 8/2016 |
| WO | 2016/047009 A1 | 3/2016 |

* cited by examiner

THREE-DIMENSIONAL DISPLAY DEVICE, THREE-DIMENSIONAL DISPLAY SYSTEM, HEAD-UP DISPLAY, AND MOBILE OBJECT

CROSS-REFERENCE TO RELATED APPLICATION

This application claims priority to Japanese Patent Application No. 2018-208415 (filed on Nov. 5, 2018), the contents of which are incorporated herein by reference in its entirety.

TECHNICAL FIELD

The present disclosure relates to a three-dimensional display device, a three-dimensional display system, a head-up display, and a mobile object.

BACKGROUND

In a related art, when a parallax barrier is used as an optical member, there are known display devices that reduce the occurrence of moire including uneven brightness or uneven color by arranging light-transmitting regions and dimming regions diagonally. This technique is disclosed in, for example, US Patent Application Publication No. 2015/0362740.

SUMMARY

A three-dimensional display device according to an embodiment of the disclosure includes a display panel and an optical member. The display panel is configured to display a parallax image including a first image to be viewed by a first eye of a user and a second image to be viewed by a second eye of the user. The optical member includes a plurality of optical elements. The optical elements are arranged along a predetermined direction which includes a component in a parallax direction of the first eye and the second eye. A beam direction of the parallax image is defined by the plurality of optical elements. The display panel includes a plurality of subpixels including a plurality of minipixels. Each of the minipixels included in the plurality of subpixels is configured to be able to display different images.

A three-dimensional display system of the disclosure includes a position detection device and a three-dimensional display device. The position detection device detects positions of eyes of a user. The three-dimensional display device includes a display panel and an optical member. The display panel is configured to display a parallax image including a first image to be viewed by a first eye of the user and a second image to be viewed by a second eye of the user. The optical member includes a plurality of optical elements. The optical elements are arranged along a predetermined direction which includes a component in a parallax direction of the first eye and the second eye. A beam direction of the parallax image is defined by the plurality of optical elements. The display panel has a plurality of subpixels including a plurality of minipixels. Each of the minipixels included in the plurality of subpixels is configured to be able to display different images.

A head-up display of the disclosure includes a three-dimensional display device and a projected member. The projected member includes a projected surface. The three-dimensional display device includes a display panel and an optical member. The display panel is configured to display a parallax image including a first image to be viewed by a first eye of a user and a second image to be viewed by a second eye of the user. The optical member includes a plurality of optical elements. The optical elements are arranged along a predetermined direction which includes a component in a parallax direction of the first eye and the second eye. A beam direction of the parallax image is defined by the plurality of optical elements. The display panel includes a plurality of subpixels including a plurality of minipixels. Each of the minipixels included in the plurality of subpixels is configured to be able to display different images. The three-dimensional display device is configured to project the first image and the second image on the projected surface. The three-dimensional display device is configured to allow the user to view the first image and the second image through the projected surface.

A mobile object of the disclosure is equipped with a head-up display. The head-up display includes a three-dimensional display device and a projected member. The projected member includes a projected surface. The three-dimensional display device includes a display panel and an optical member. The display panel is configured to display a parallax image including a first image to be viewed by a first eye of a user and a second image to be viewed by a second eye of the user. The optical member includes a plurality of optical elements. The optical elements are arranged along a predetermined direction which includes a component in a parallax direction of the first eye and the second eye. A beam direction of the parallax image is defined by the plurality of optical elements. The display panel includes a plurality of subpixels including a plurality of minipixels. Each of the minipixels included in the plurality of subpixels is configured to be able to display different images. The three-dimensional display device is configured to project the first image and the second image on the projected surface. The three-dimensional display device is configured to allow the user to view the first image and the second image through the projected surface.

DETAILED DESCRIPTION

Hereinafter, embodiments of the disclosure will be described with reference to drawings.

<Configuration of Display Device>

Figure 1:
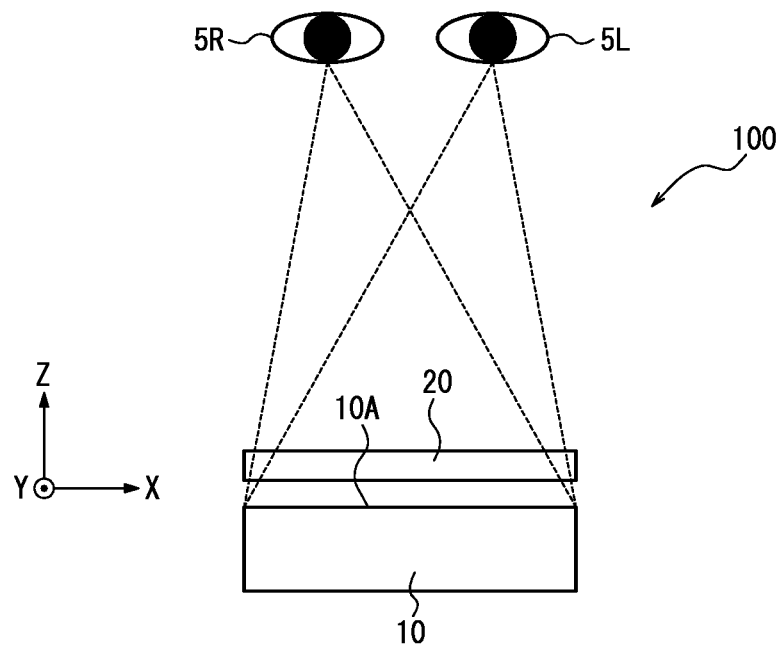
FIG. 1 is a view illustrating a configuration example of a display device according to an embodiment.
Figure 2:
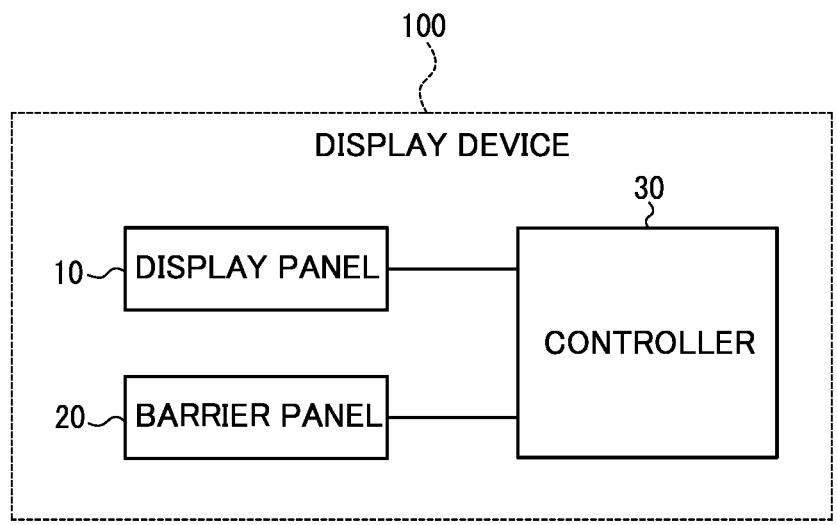
FIG. 2 is a block diagram illustrating the configuration example of the display device according to the embodiment.

As illustrated in FIGS. 1 and 2, a display device 100 according to an embodiment includes a display panel 10 and a barrier panel 20 as an optical member. The display device 100 is also referred to as a three-dimensional display device. The display device 100 may further include a controller 30. In this embodiment, it is assumed that the barrier panel 20 is used as an optical member. The optical member is not limited to the barrier panel 20. As the optical member, for example, a lenticular lens 25 (see FIG. 7) may be used.

The controller 30 is connected to components such as the display panel 10 and the barrier panel 20 included in the display device 100, and is configured to control each configuration requirement. The controller 30 may be configured as, for example, a processor. The controller 30 may include one or more processors. The processor may include a general-purpose processor that loads a specific program and executes a specific function, and a dedicated processor specialized for a specific type of processing. The dedicated processor may include an application specific integrated circuit (ASIC). The processor may include a programmable logic device (PLD). The PLD may include an FPGA (Field-Programmable Gate Array). The controller 30 may be either a SoC (System-on-a-Chip) or SiP (System In a Package), which is configured to cooperate with one or a plurality of processors. The controller 30 may include a storage unit. The controller 30 may store various kinds of information, a program for operating each component of the display device 100, or the like in the storage unit. The storage unit may include, for example, a semiconductor memory or the like. The storage unit may be configured to function as a work memory of the controller 30.

The display panel 10 may include, for example, a transmissive liquid crystal panel, or a display panel such as an organic EL (Electro-Luminescence) panel or an inorganic EL panel. The display panel 10 is configured to display a parallax image on a display surface 10A. The parallax image includes a plurality of left-eye images and a plurality of right-eye images having parallax with respect to the plurality of left-eye images. The display panel 10 is configured to display the plurality of left-eye images to be viewed by a left eye 5L of the user in a plurality of left-eye image regions PgL. The display panel 10 is configured to display the plurality of right-eye images to be viewed by a right-eye 5R of the user in a plurality of right-eye image regions PgR. The plurality of left-eye images and the plurality of right-eye images are also referred to as a plurality of first images and a plurality of second images, respectively. The left eye 5L and right eye 5R of the user are also referred to as a first eye and a second eye, respectively. An X-axis direction corresponds to the direction in which parallax is given to the left eye 5L and right eye 5R of the user. The direction that gives parallax to the left eye 5L and right eye 5R of the user is also referred to as a parallax direction.

Figure 3A:
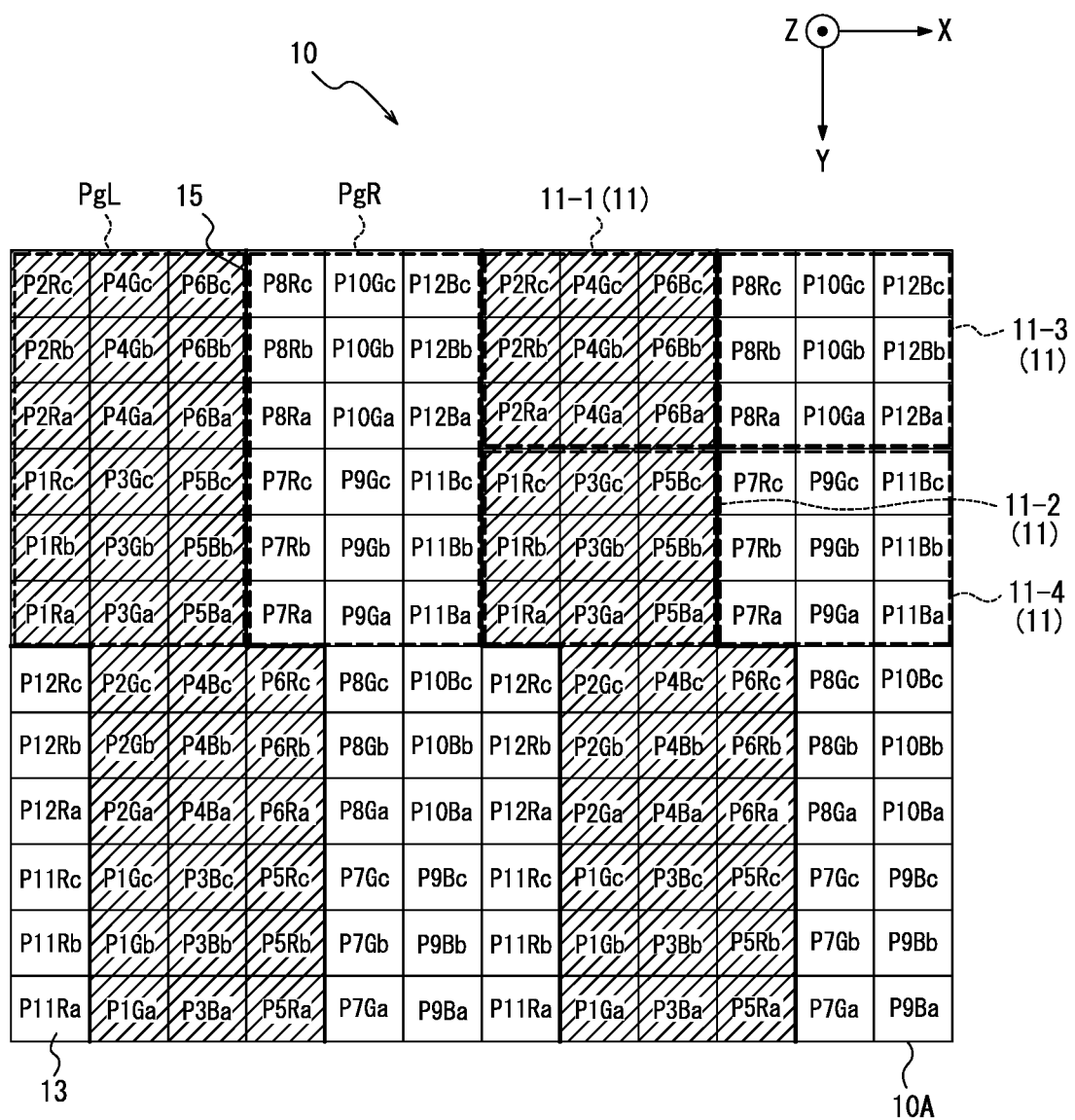
FIG. 3A is a view illustrating a configuration example of pixels in a display panel according to the embodiment.
Figure 3B:
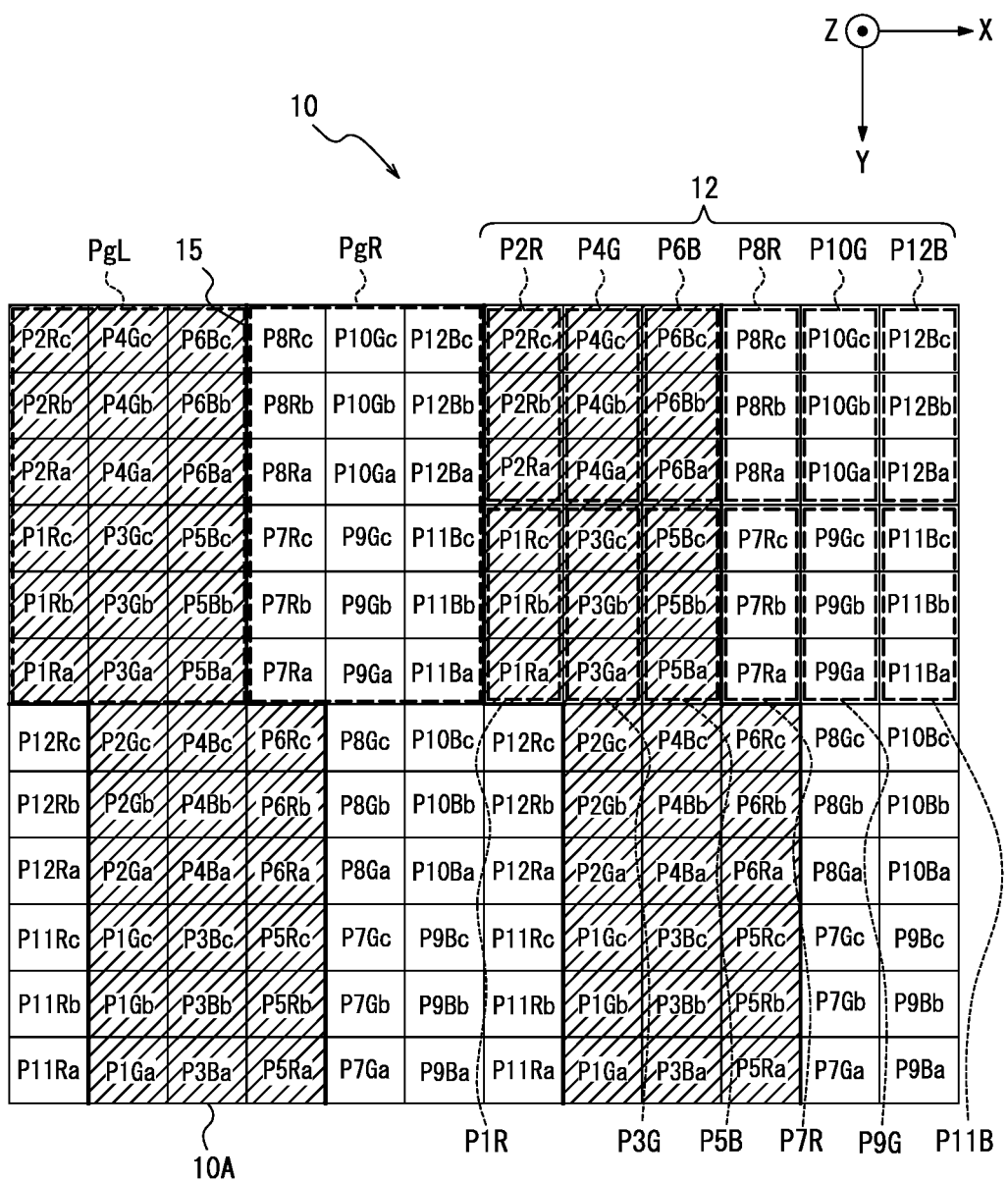
FIG. 3B is a view illustrating a configuration example of subpixels in the display panel according to the embodiment.

As illustrated in FIGS. 3A and 3B, the display panel 10 is configured to emit image light traveling from the plurality of left-eye image regions PgL toward the position of the left eye 5L of the user. The display panel 10 is configured to emit image light traveling from the plurality of right-eye image regions PgR toward the position of the right eye 5R of the user. The boundary between the plurality of left-eye image regions PgL and the plurality of right-eye image regions PgR is referred to as a display boundary 15. The display panel 10 is configured to display a plurality of left-eye images in the plurality of left-eye image regions PgL. The display panel 10 is configured to display a plurality of right-eye images in the plurality of right-eye image regions PgR. The user views the plurality of left-eye images displayed in the plurality of left-eye image regions PgL with the left eye 5L. The user views the plurality of right-eye images displayed in the plurality of right-eye image regions PgR with the right eye 5R. The X-axis direction corresponds to the horizontal direction when viewed from the user. A Y-axis direction corresponds to the vertical direction when viewed from the user. A Z-axis direction corresponds to the depth direction when viewed from the user. The X-axis direction, the Y-axis direction, and the Z-axis direction are also referred to as a first direction, a second direction, and a third direction, respectively.

The state in which the user views at least a part of the plurality of right-eye images displayed in the plurality of right-eye image regions PgR with the left eye 5L or the state in which the user views at least a part of the plurality of left-eye images displayed in the plurality of left-eye image regions PgL with the right eye 5R is called crosstalk. Crosstalk deteriorates the quality of the images provided to the user in a binocular three-dimensional display.

Each left-eye image region PgL includes a plurality of pixels 11. For example, the left-eye image region PgL is assumed to include pixels 11_1 and pixels 11_2, as illustrated in FIG. 3A. Each right-eye image region PgR includes a plurality of pixels 11. For example, the right-eye image region PgR is assumed to include pixels 11_3 and pixels 11_4, as illustrated in FIG. 3A.

As illustrated in FIG. 3B, each pixel 11 positioned in the plurality of left-eye image regions PgL includes a plurality of subpixels 12. It is assumed that each subpixel 12 is distinguished by a branch number such as P1R and P2R. Hereinafter, the subpixel 12 having P1R as a branch number is represented as subpixel 12_P1R. For example, the pixel 11_1 (see FIG. 3A) positioned in the plurality of left-eye image regions PgL includes a subpixel 12_P2R configured to be able to display red, a subpixel 12_P4G configured to be able to display green, and a subpixel 12_P6B configured to be able to display blue. Red, blue, and green are also referred to as R, B and G, respectively. For example, the pixel 11_2 (see FIG. 3A) positioned in the plurality of left-eye image regions PgL includes a subpixel 12_P1R configured to be able to display R, a subpixel 12_P3G configured to be able to display G, and a subpixel 12_P5B configured to be able to display B.

As illustrated in FIG. 3B, each pixel 11 positioned in the plurality of right-eye image regions PgR includes the plurality of subpixels 12. For example, the pixel 11_3 (see FIG. 3A) positioned in the plurality of right-eye image regions PgR includes a subpixel 12_P8R configured to be able to display R, a subpixel 12_P10G configured to be able to display G, and a subpixel 12_P12B configured to be able to display B. For example, the pixel 11_4 (see FIG. 3A) positioned in the plurality of right-eye image regions PgR includes subpixels 12_P7R configured to be able to display R, a subpixel 12_P9G configured to be able to display G, and a subpixel 12_P11B configured to be able to display B.

The number of subpixels 12 included in each pixel 11 is not limited to 3, and may be 2 or less, or 4 or more. The number of colors displayed by the subpixel 12 included in each pixel 11 is not limited to 3, and may be 2 or less, or 4 or more.

The plurality of subpixels 12 may be arranged so as to display different colors in order in the horizontal direction on the display surface 10A. In the example of FIGS. 3A and 3B, in the pixel 11_1, the subpixel 12_P2R configured to display R, the subpixel 12_P4G configured to display G, and the subpixel 12_P6B configured to display B are arranged in order in the horizontal direction. In the pixel 11_2, the subpixel 12_P1R configured to display R, the subpixel 12_P3G configured to display G, and the subpixel 12_P5B configured to display B are arranged in order in the horizontal direction.

The plurality of subpixels 12 configured to display the same color may be arranged in the vertical direction on the display surface 10A. In the example of FIG. 3B, the subpixel 12_P2R configured to display R and the subpixel 12_P1R configured to display R are arranged in order in the vertical direction. The subpixel 12_P4G configured to display G and the subpixel 12_12_P3G configured to display G are arranged in order in the vertical direction. The subpixel 12_P6B configured to display B and the subpixel 12_P5B configured to display B are arranged in order in the vertical direction.

The display panel 10 is partitioned in a grid shape along the horizontal and vertical directions on the display surface 10A by a grid-like black matrix. A plurality of regions that are partitioned are also referred to as a plurality of partitioned regions. One subpixel 12 corresponds to each partition region.

As illustrated in FIG. 3A, each pixel 11 includes a plurality of minipixels 13. It is assumed that each minipixel 13 is distinguished by a branch number such as P1Ra, P1Rb and P1Rc. Hereinafter, the minipixel 13 having P1Ra as a branch number is represented as minipixel 13_P1Ra. It is assumed that the number of minipixels 13 included in each pixel 11 is 9. The number of minipixels 13 included in each pixel 11 is not limited to 9, and may be 8 or less, or 10 or more. As illustrated in FIG. 3B, each subpixel 12 includes the plurality of minipixels 13. It is assumed that the number of minipixels 13 included in each subpixel 12 is 3. The number of minipixels 13 included in each pixel 11 is not limited to 3, and may be 2 or less, or 4 or more. The larger the number of minipixels 13 included in one pixel 11 or one subpixel 12, the higher the resolution of the image displayed by the display panel 10.

For example, a plurality of subpixels 12_P1R positioned in the plurality of left-eye image regions PgL include a minipixel 13_P1Ra, a minipixel 13_P1Rb, and a minipixel 13_P1Rc. For example, a plurality of subpixels 12_P2R positioned in the plurality of left-eye image regions PgL include a minipixel 13_P2Ra, a minipixel 13_P2Rb, and a minipixel 13_P2Rc.

For example, a plurality of subpixels 12_P7R positioned in the plurality of right-eye image regions PgR include a minipixel 13_P7Ra, a minipixel 13_P7Rb, and a minipixel 13_P7Rc. For example, a plurality of subpixels 12_P8R positioned in the plurality of right-eye image regions PgR include a minipixel 13_P8Ra, a minipixel 13_P8Rb, and a minipixel 13_P8Rc.

The plurality of minipixels 13 included in one subpixel 12 are configured to display the same color. For example, each minipixel 13 included in the subpixel 12_P1R is configured to display R. Each minipixel 13 included in subpixel 12_P1G is configured to display G. Each minipixel 13 included in subpixel 12_P1B is configured to display B. For example, in the subpixel 12_P1R, the minipixel 13_P1Rc configured to display R, the minipixel 13_P1Rb configured to display R, and the minipixel 13_P1Ra configured to display R are arranged in order in the vertical direction. For example, in the subpixel 12_P2R, the minipixel 13_P2Rc configured to display R, the minipixel 13_P2Rb configured to display R, and the minipixel 13_P2Ra configured to display R are arranged in order in the vertical direction.

The controller 30 is configured to be able to display an image with one pixel 13 as the minimum unit. The controller 30 is configured to cause one minipixel 13 as the minimum unit to display an image, and therefore the image to be displayed on the display panel 10 can be arbitrarily changed. In the example of FIG. 3A and the like, the shape of each minipixel 13 is a square, but may be various shapes such as a rectangle or a trapezoid.

The display panel 10 is controlled by the controller 30 and is configured to change the image displayed on each minipixel 13. The display panel 10 may be configured to display either a left-eye image or a right-eye image on each minipixel 13. The display panel 10 may be configured to display any of R, G, and B on each minipixel 13 with a predetermined brightness. The display panel 10 may be configured to display black by lowering the display brightness of each minipixel 13.

Figure 4:
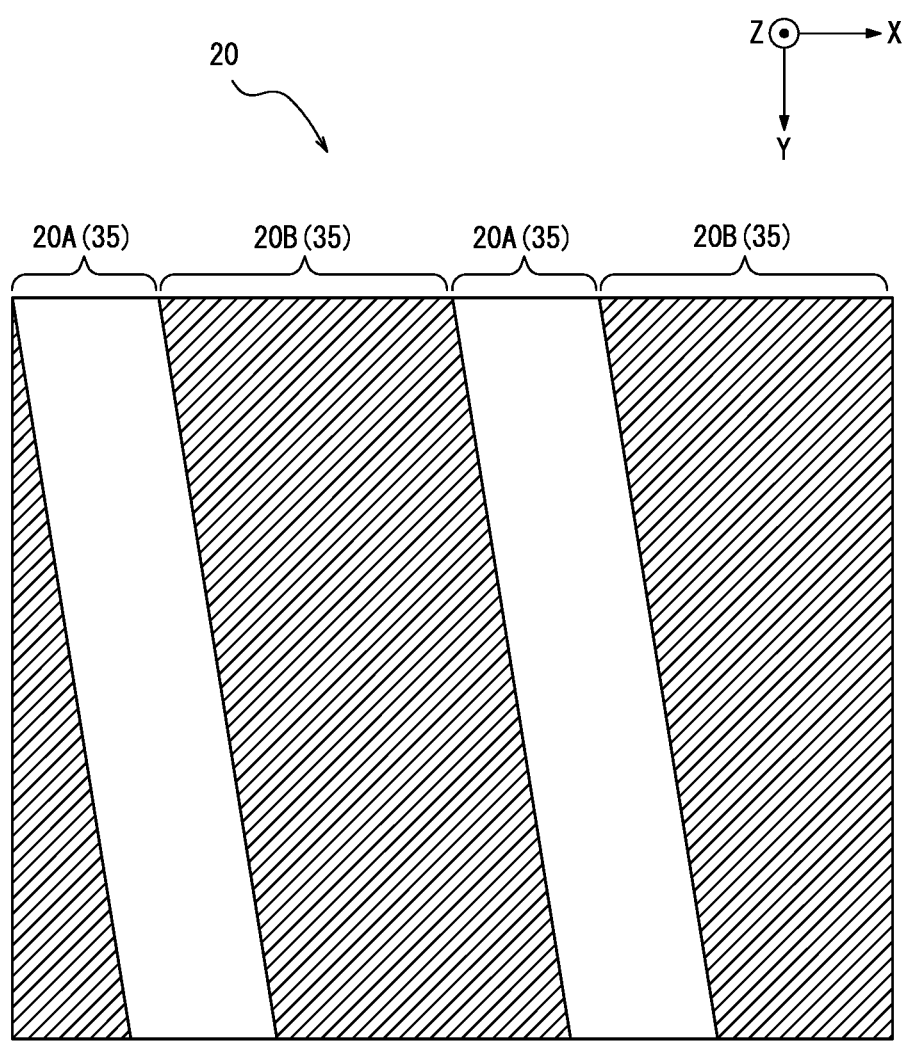
FIG. 4 is a view illustrating a configuration example of a barrier panel according to the embodiment.

As illustrated in FIG. 4, the barrier panel 20 includes a plurality of optical elements 35. The barrier panel 20 includes a plurality of light-transmitting regions 20A and a plurality of dimming regions 20B as the plurality of optical elements 35. The plurality of light-transmitting regions 20A are configured to transmit the image light emitted from the display panel 10 with a light transmittance equal to or higher than a first transmittance. The plurality of dimming regions 20B are configured to transmit the image light emitted from the display panel 10 with a light transmittance equal to or lower than a second transmittance. The first transmittance may be higher than the second transmittance. The ratio of the second transmittance to the first transmittance can be 1/100 in one example. The ratio of the second transmittance to the first transmittance can be 1/1000 in other examples.

The plurality of light-transmitting regions 20A are configured so that the image light related to the plurality of left-eye images reaches the left eye 5L of the user. The plurality of light-transmitting regions 20A are configured so that the image light related to the plurality of right-eye images reaches the right eye 5R of the user. The plurality of dimming regions 20B are configured so that the image light related to the plurality of left-eye images does not reach or is less likely to reach the right eye 5R of the user. The plurality of dimming regions 20B are configured so that the image light related to the plurality of right-eye images does not reach or is less likely to reach the left eye 5L of the user. That is, the plurality of optical elements 35 are configured so that the image light related to the plurality of left-eye images reaches the left eye 5L of the user, and the image light related to the plurality of right-eye images reaches the right eye 5R of the user. The plurality of optical elements 35 are configured so that the image light related to the plurality of left-eye images does not reach or is less likely to reach the right eye 5R of the user. The plurality of optical elements 35 are configured so that the image light related to the plurality of right-eye images does not reach or is less likely to reach the left eye 5L of the user. The plurality of optical elements 35 can be configured to function so that the user can view the plurality of right-eye images with the right eye 5R. The plurality of optical elements 35 can be configured to function so that the user cannot or hardly view the plurality of right-eye images with the left eye 5L. The plurality of optical elements 35 can be configured to function so that the user can view the plurality of left-eye images with the left eye 5L. The plurality of optical elements 35 can be configured to function so that the user cannot or hardly view the plurality of left-eye images with the right eye 5R. The direction of the image light related to the parallax image including the plurality of left-eye images and the plurality of right-eye images is defined by the plurality of optical elements 35. The direction of the image related to the parallax image is also referred to as a ray direction of the parallax image.

The plurality of light-transmitting regions 20A and the plurality of dimming regions 20B are arranged alternately in the X-axis direction. That is, the plurality of optical elements 35 are arranged along the parallax direction. The boundary between the plurality of light-transmitting regions 20A and the plurality of dimming regions 20B may extend along the Y-axis direction as illustrated in FIG. 4 or may extend along a direction inclined at a predetermined angle with respect to the Y-axis direction. The boundary between the plurality of light-transmitting regions 20A and the plurality of dimming regions 20B may extend along a direction intersecting the parallax direction. In other words, the plurality of light-transmitting regions 20A and the plurality of dimming regions 20B may be arranged alternately along a predetermined direction which includes a component in the parallax direction.

The barrier panel 20 may be configured to be controlled by the controller 30. The controller 30 may be configured such that a part of the barrier panel 20 is the plurality of light-transmitting regions 20A and the other part of the barrier panel 20 is the plurality of dimming regions 20B.

By configuring the barrier panel 20 to be controlled by the controller 30, the plurality of light-transmitting regions 20A and the plurality of dimming regions 20B in the barrier panel 20 can be configured to be arbitrarily changed.

The barrier panel 20 may include, for example, a liquid crystal shutter. The liquid crystal shutter can be configured to control the light transmittance based on an applied voltage. The liquid crystal shutter includes a plurality of pixels. The liquid crystal shutter may be configured to control the light transmittance in each pixel. For example, the barrier panel 20 is configured to change a plurality of pixels from the plurality of light-transmitting regions 20A having the first transmittance to the plurality of dimming regions 20B having the second transmittance. For example, the barrier panel 20 is configured to change a plurality of pixels from the plurality of dimming regions 20B having the second transmittance to the plurality of light-transmitting regions 20A having the first transmittance.

By configuring the plurality of pixels of the barrier panel 20 to be arbitrarily controlled by the controller 30, the plurality of light-transmitting regions 20A or the plurality of dimming regions 20B can be arbitrarily changed according to the change of the image displayed on the display panel 10.

Figure 5A:
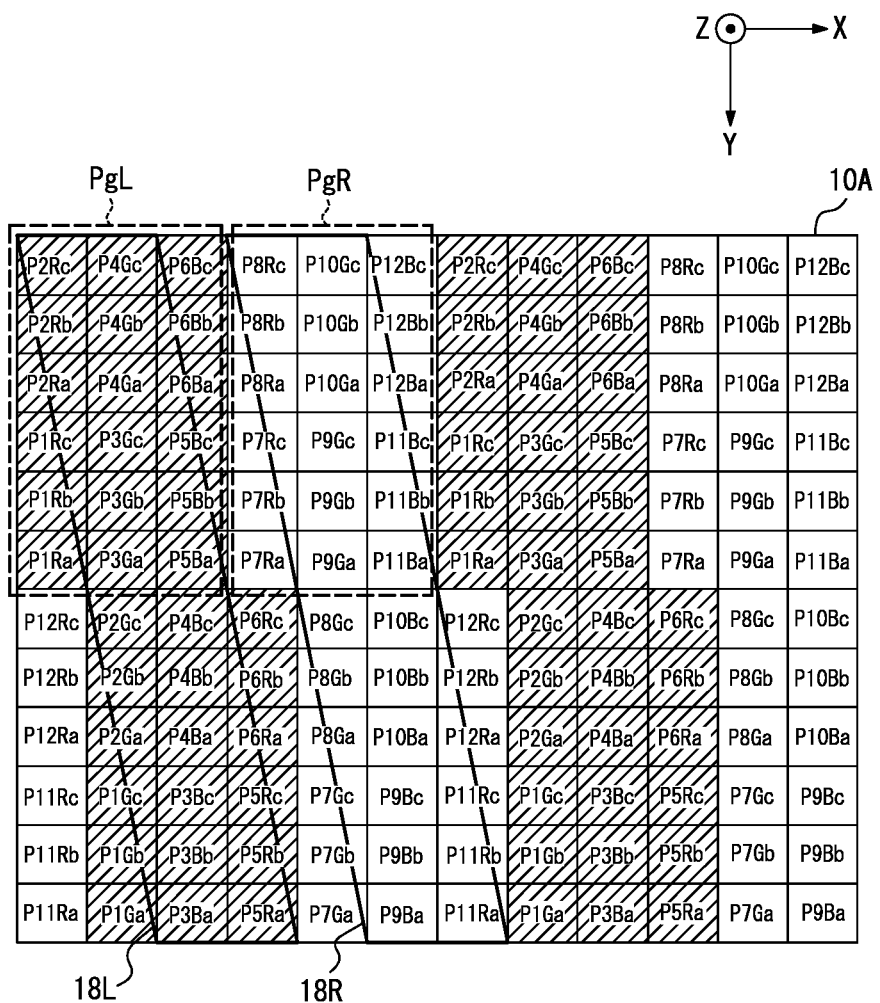
FIG. 5A is a schematic view of the display device according to the embodiment, illustrating visible regions of a display surface when a viewpoint position of the user is in a first position.
Figure 5B:
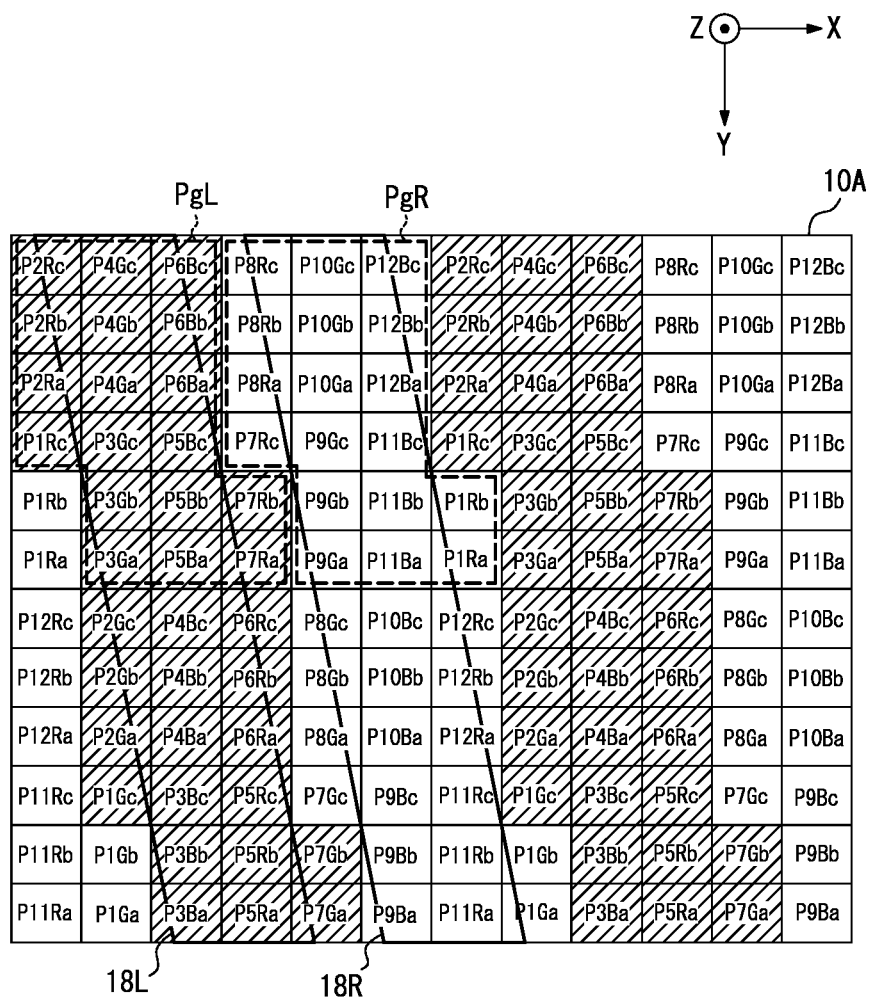
FIG. 5B is a schematic view of the display device according to the embodiment, illustrating visible regions of the display surface when the viewpoint position of the user is at a second position.

By defining the beam direction of the image light by the barrier panel 20, the region on the display surface 10A that can be viewed by the right eye 5R of the user and the left eye 5L of the user is determined. In FIGS. 5A and 5B, the region on the display surface 10A that can be viewed by the right eye 5R of the user is illustrated as a plurality of right-eye visible regions 18R. In FIGS. 5A and 5B, the region on the display surface 10A that can be viewed by the left eye 5L of the user is illustrated as a plurality of left-eye visible regions 18L. In the examples of FIGS. 5A and 5B, the boundary between the plurality of right-eye visible regions 18R and the plurality of left-eye visible regions 18L corresponds to the boundary between the plurality of light-transmitting regions 20A and the plurality of dimming regions 20B illustrated in FIG. 4. The boundary of the plurality of right-eye visible regions 18R is represented by diagonal solid lines from the minipixel 13_P2Rc to the minipixel 13_P1Ga and diagonal solid lines from the minipixel 13_P6Bc to the minipixel 13_P5Ra. The boundary of the plurality of left-eye visible regions 18L is represented by diagonal solid lines from the minipixel 13_P8Rc to the minipixel 13_P7Ga and diagonal solid lines from the minipixel 13_P12Bc to the minipixel 13_P11Ra.

The display panel 10 is configured to display a plurality of right-eye images on the plurality of subpixels 12 or the plurality of minipixels 13 positioned in the plurality of right-eye visible regions 18R. That is, the controller 30 is configured to set the plurality of right-eye image regions PgR as illustrated in FIGS. 5A and 5B. The barrier panel 20 is configured to allow the image light emitted from the plurality of subpixels 12 or the plurality of minipixels 13 positioned in the plurality of right-eye visible regions 18R to pass through the plurality of light-transmitting regions 20A and travel toward the right eye 5R of the user. By doing so, the right eye 5R of the user can view a plurality of right-eye images. The display panel 10 displays a plurality of left-eye images on the plurality of subpixels 12 or the plurality of minipixels 13 positioned in the plurality of left-eye visible regions 18L. That is, the controller 30 is configured to set the plurality of left-eye image regions PgL as illustrated in FIGS. 5A and 5B. The barrier panel 20 is configured to allow the image light emitted from the plurality of subpixels 12 or the plurality of minipixels 13 positioned in the plurality of left-eye visible regions 18L to pass through the plurality of light-transmitting regions 20A and travel toward the left eye 5L of the user. By doing so, the right eye 5R of the user can view a plurality of right-eye images. As a result, the user can view a three-dimensional image without using glasses.

The position of at least one of the left eye 5L and right eye 5R of the user is also referred to as a viewpoint position of the user. The positions of the plurality of left-eye visible regions 18L and the plurality of right-eye visible regions 18R on the display surface 10A are determined based on the viewpoint position of the user. It is assumed that the plurality of left-eye visible regions 18L and the plurality of right-eye visible regions 18R when the viewpoint position of the user is at a first position are illustrated in FIG. 5A. It is assumed that the plurality of left-eye visible regions 18L and the plurality of right-eye visible regions 18R when the viewpoint position of the user is at a second position are illustrated in FIG. 5B.

As illustrated in FIGS. 5A and 5B, the controller 30 is configured to set the plurality of left-eye image regions PgL to include the plurality of left-eye visible regions 18L. The controller 30 is configured to set the plurality of right-eye image regions PgR to include the plurality of right-eye visible regions 18R. The display panel 10 is configured to display a plurality of left-eye images on the plurality of minipixels 13 included in the plurality of left-eye image regions PgL. The display panel 10 is configured to display a plurality of right-eye images on the plurality of minipixels 13 included in the plurality of right-eye image regions PgR. By moving the positions of the plurality of left-eye visible regions 18L and the plurality of right-eye visible regions 18R based on the movement of the viewpoint position of the user, for example, the minipixels 13_P7Ra and 13_P7Rb included in the subpixel 12_P7R display the left-eye image in FIG. 5A and the right-eye image in FIG. 5B. The minipixel 13_P7Rc included in the same subpixel 12_P7R displays the left-eye image in both FIG. 5A and FIG. 5B. That is, the controller 30 is configured to cause some of the minipixels 13 among the minipixels 13 included in one subpixel 12, to display the left-eye image and cause another minipixel 13 to display the right-eye image according to the movement of the viewpoint position of the user. One subpixel 12 may include a first minipixel displaying the left-eye image and a second minipixel displaying the right-eye image. The controller 30 may be configured to cause the first minipixel to display the left-eye image (first image) and cause the second minipixel to display the right-eye image (second image). The image quality of the parallax image can be improved by the controller 30 being configured to perform a display of one of a plurality of left-eye images and a plurality of right-eye images in units of minipixels 13.

If the plurality of left-eye visible regions 18L and the plurality of right-eye visible regions 18R are adjacent to each other on the display surface 10A, at least some of the plurality of minipixels 13 are included in both the plurality of left-eye visible regions 18L and the plurality of right-eye visible regions 18R. The plurality of minipixels 13 included in both the plurality of left-eye visible regions 18L and the plurality of right-eye visible regions 18R can cause crosstalk. The controller 30 may be configured to reduce crosstalk by being configured to cause the plurality of minipixels 13 included in both the plurality of left-eye visible regions 18L and the plurality of right-eye visible regions 18R to display a plurality of black images. Crosstalk is likely to be reduced by the controller 30 being configured to perform a display of a plurality of black images in units of minipixels 13 even when the plurality of left-eye visible regions 18L and the plurality of right-eye visible regions 18R are adjacent to each other or close to each other. When the plurality of left-eye visible regions 18L and the plurality of right-eye visible regions 18R are adjacent to each other or close to each other on the display surface 10A, the image light reaching the eyes of the user increases. As a result, the brightness of the image viewed by the user can be increased.

Comparative Example

Figure 6A:
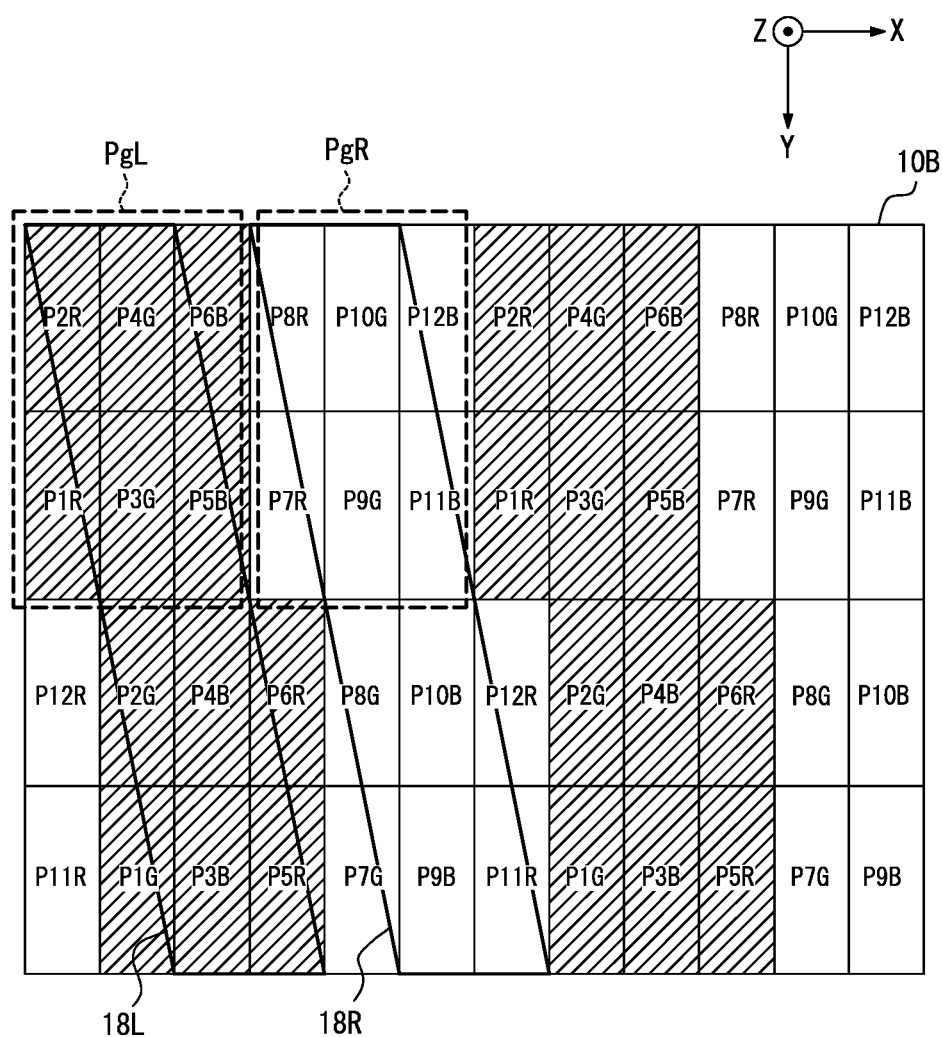
FIG. 6A is a schematic view of a display device according to a comparative example, and is a schematic view illustrating visible regions of a display surface when a viewpoint position of the user is in a first position.
Figure 6B:
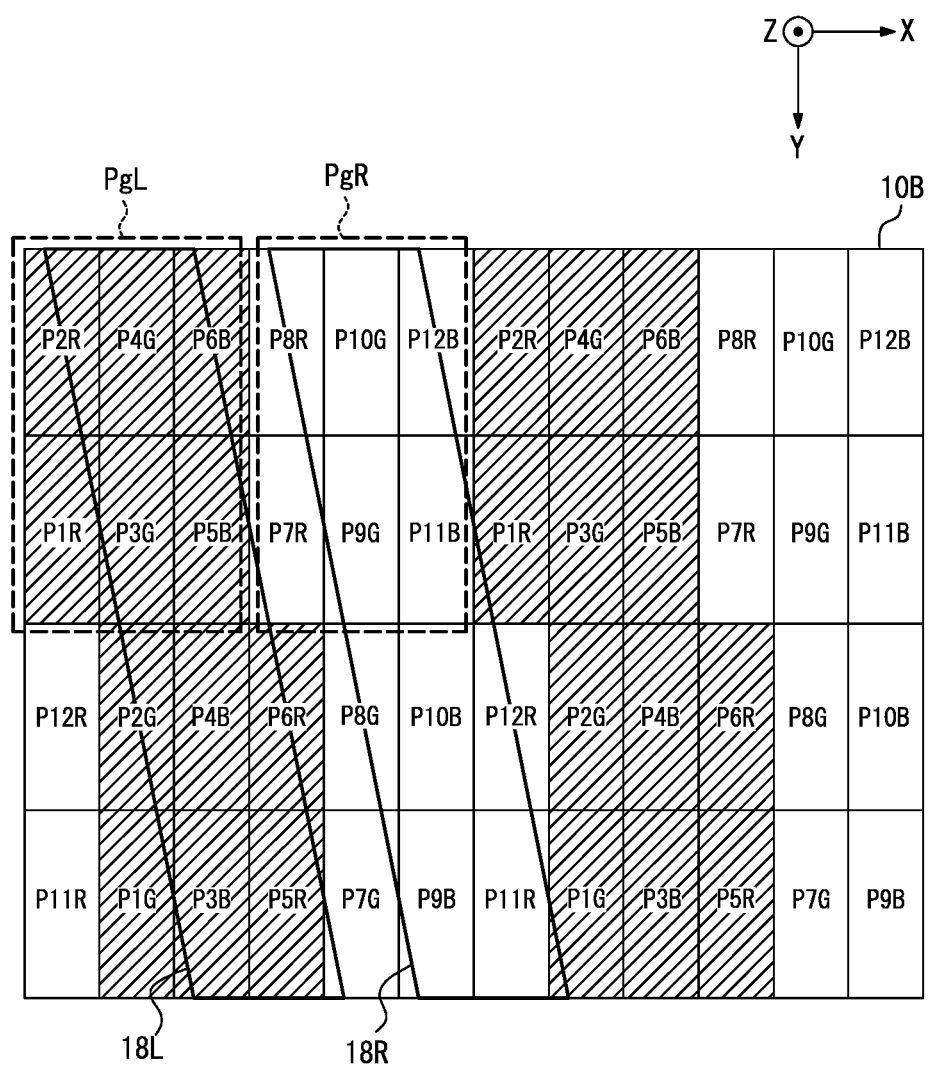
FIG. 6B is a schematic view of the display device according to the comparative example, illustrating visible regions of the display surface when the viewpoint position of the user is in a second position.

In a comparative example illustrated in FIGS. 6A and 6B, it is assumed that the controller 30 is configured to control the image displayed in units of subpixels 12. It is assumed that the plurality of left-eye visible regions 18L and the plurality of right-eye visible regions 18R when the viewpoint position of the user is at the first position are illustrated in FIG. 6A. It is assumed that the plurality of left-eye visible regions 18L and the plurality of right-eye visible regions 18R when the viewpoint position of the user is at the second position are illustrated in FIG. 6B.

As illustrated in FIG. 6A, when the viewpoint position of the user is at the first position, the plurality of left-eye visible regions 18L are included in the subpixels 12_P1R, 12_P2R, 12_P3G, 12_P4G, 12_P5B and 12_P6B. The plurality of right-eye visible regions 18R are included in subpixels 12_P7R, 12_P8R, 12_P9G, 12_P10G, 12P_11B, and 12_P12B. In this case, the controller 30 can allow the left eye 5L to view the plurality of left-eye images by being configured to cause the subpixels 12_P1R, 12_P2R, 12_P3G, 12_P4G, 12_P5B, and 12_P6B to display the plurality of left-eye images. The controller 30 can allow the right eye 5R to view the plurality of right-eye images by being configured to cause the subpixels 12_P7R, 12_P8R, 12_P9G, 12_P10G, 12_P11B, and 12_P12B to display the plurality of right-eye images.

As illustrated in FIG. 6B, when the viewpoint position of the user is moved to the second position, the left-eye visible regions 18L are further included in the subpixel 12_P7R. The subpixel 12_P7R also includes the right-eye visible regions 18R. Crosstalk occurs regardless of whether the controller 30 is configured to cause the subpixel 12_P7R to display the right-eye image or the left-eye image. When the controller 30 is configured to cause the subpixel 12_P7R to display a black image in order to reduce crosstalk, the brightness of the image viewed by the user is reduced. The plurality of light-transmitting regions 20A of the barrier panel 20 may be narrowed in order to increase the plurality of subpixels 12 that do not include either of the plurality of left-eye visible regions 18L and the plurality of right-eye visible regions 18R. When the plurality of light-transmitting regions 20A are narrowed, the brightness of the image viewed by the user is reduced.

The display device 100 according to the present embodiment is configured to control the display of an image in units of minipixels 13 smaller than the subpixels 12. By doing so, the crosstalk is likely to be reduced as compared with the configuration in which the display of the image is controlled in units of 12 subpixels, and the brightness of the image viewed by the user is less likely to be reduced. That is, the display device 100 according to the present embodiment can provide the user with a parallax image of which the brightness is less likely to decrease while the crosstalk is reduced.

For example, if at least some of the plurality of minipixels 13 included in one subpixel 12 display a plurality of right-eye images, the controller 30 may be configured to cause the display panel 10 to change the number of the plurality of minipixels 13 displaying the plurality of right-eye images. In this case, the controller 30 may be configured to cause the display panel 10 to change the gradation of the plurality of minipixels 13 displaying the plurality of right-eye images. By doing so, the brightness of the plurality of right-eye images displayed on each subpixel 12 can be kept constant.

For example, if all the minipixels 13 included in one subpixel 12 are displaying a plurality of right-eye images, the controller 30 may be configured to reduce the number of the plurality of minipixels 13 displaying the plurality of right-eye images on the display panel 10. In this case, the controller 30 may be configured to raise the gradation of the plurality of minipixels 13 displaying the plurality of right-eye images on the display panel 10.

For example, if some minipixels 13 included in one subpixel 12 display a plurality of right-eye images, the controller 30 may be configured to increase the number of the plurality of minipixels 13 displaying the plurality of right-eye images on the display panel 10. In this case, the controller 30 may be configured to lower the gradation of the plurality of minipixels 13 displaying the plurality of right-eye images on the display panel 10.

When the image displayed on the display panel 10 is appropriately controlled by the controller 30, as illustrated in FIGS. 5A and 5B, a plurality of right-eye visible regions 18R that can be viewed by the right eye 5R are formed on the display surface 10A of the display panel 10 through the plurality of light-transmitting regions 20A of the barrier panel 20. When the image displayed on the display panel 10 is appropriately controlled by the controller 30, as illustrated in FIGS. 5A and 5B, a plurality of left-eye visible regions 18L that can be viewed by the left eye 5L are formed on the display surface 10A of the display panel 10 through the plurality of light-transmitting regions 20A of the barrier panel 20.

When the image displayed on the display panel 10 is arbitrarily controlled by the controller 30 in units of minipixels 13, the controller 30 can be configured to change only the image displayed on the minipixel 13 that causes crosstalk. As a result, it is possible to realize the display device 100 capable of increasing the brightness of the image to be viewed by the user while reducing crosstalk. The image displayed on the display panel 10 is arbitrarily controlled by the controller 30 in units of minipixels 13, and therefore the resolution of the image displayed on the display surface 10A on the display device 100 can be increased.

The controller 30 is configured to cause the plurality of subpixels 12 positioned in the plurality of left-eye visible regions 18L of the display panel 10, to display a part of a plurality of left-eye images. For example, the controller 30 is configured to cause the subpixels 12_P1R, 12_P2R, 12_P3G, 12_P4G, 12_P5B, and 12_P6B positioned in the plurality of left-eye visible regions 18L of the display panel 10, to display a part of a plurality of left-eye images.

The controller 30 is configured to cause the plurality of subpixels 12 positioned in the plurality of right-eye visible regions 18R of the display panel 10, to display a part of a plurality of right-eye images. For example, the controller 30 is configured to cause the subpixels 12_P7R, 12_P8R, 12_P9G, 12_P10G, 12_P11B, and 12_P12B positioned in the plurality of right-eye visible regions 18R of the display panel 10, to display a part of a plurality of right-eye images.

The controller 30 may be configured to cause a predetermined minipixel 13 to display a predetermined image. For example, the controller 30 may be configured to cause the predetermined minipixel 13 to display any of a red image, a green image, and a blue image. For example, the controller 30 may be configured to cause the predetermined minipixel 13 to display a black image. It is assumed that the plurality of black images are, for example, images having the brightness less than a predetermined value. The predetermined value may be a value corresponding to the brightness of the lowest gradation or the brightness of a gradation equivalent thereto among the gradation levels that can be displayed by the plurality of subpixels 12.

Figure 7:
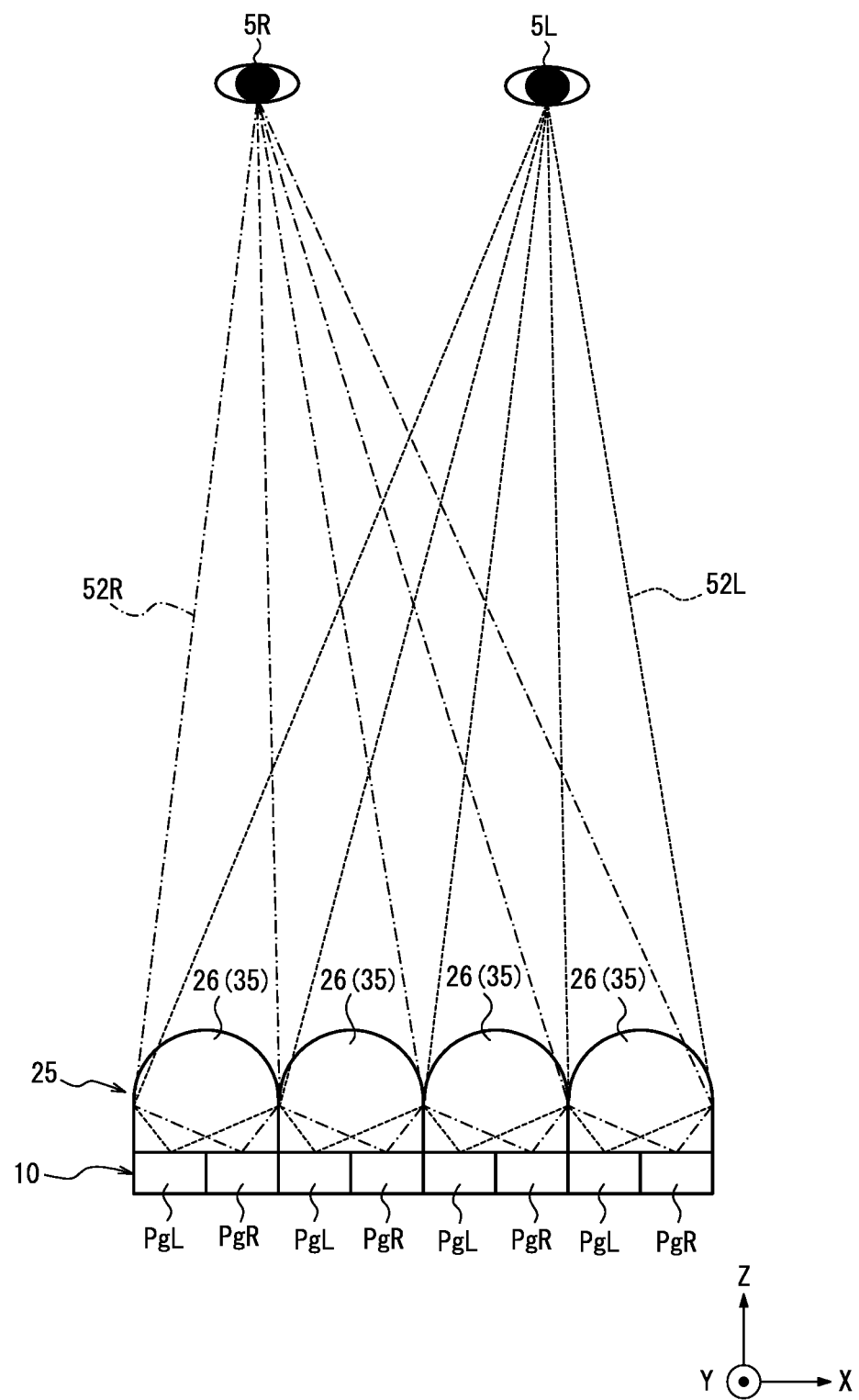
FIG. 7 is a cross-sectional view illustrating an example in which a lenticular lens is used as an optical member.

The controller 30 may be configured, for example, to detect the position of at least one of the left eye 5L and right eye 5R of the user by a position detection device 1 (see FIG. 7). The position of at least one of the left eye 5L and right eye 5R of the user is also referred to as the viewpoint position of the user. When the display device 100 does not include the position detection device 1, the controller 30 may be configured to detect the viewpoint position of the user based on a detection signal from the position detection device 1 or the like provided outside the display device 100.

The controller 30 may be configured to determine whether the image to be displayed on each minipixel 13 is a right-eye image or a left-eye image based on the viewpoint position of the user. In other words, the controller 30 may be configured to determine whether each minipixel 13 is included in the plurality of left-eye visible regions 18L or the plurality of right-eye visible regions 18R based on the viewpoint position of the user.

For example, when the viewpoint position of the user is at the first position, it is assumed that the plurality of left-eye visible regions 18L and the plurality of right-eye visible regions 18R are formed at the positions illustrated in FIG. 5A. In the example of FIG. 5A, the controller 30 is configured to cause all minipixels 13 included in each subpixel 12 to display a plurality of right-eye images.

When the viewpoint position of the user is at the second position different from the first position, it is assumed that the plurality of left-eye visible regions 18L and the plurality of right-eye visible regions 18R are formed at the positions illustrated in FIG. 5B. In the example of FIG. 5B, for example, the subpixel 12_P1R is positioned across the left-eye visible regions 18L and the right-eye visible regions 18R. Crosstalk occurs when only one of the plurality of left-eye images and the plurality of right-eye images is displayed on all the minipixels 13 of the subpixels 12 positioned across the left-eye visible regions 18L and the right-eye visible regions 18R. The controller 30 is configured to cause the minipixels 13_P1Ra and P1Rb included in the subpixel 12_P1R to display the right-eye images. The controller 30 is configured to cause the minipixel 13_P1Rc included in the subpixel 12_P1R to display the left-eye images. Crosstalk can be reduced by configuring the controller 30 to control the image to be displayed in units of minipixels 13.

Within one subpixel 12, the ratio of the number of the plurality of minipixels 13 configured to display a plurality of right-eye images to the number of minipixels 13 configured to display a plurality of left-eye images is not limited to the example of FIG. 5B.

One minipixel 13 is positioned in the right-eye visible regions 18R when the viewpoint position of the user is at the first position and is positioned in the left-eye visible regions 18L when the viewpoint position of the user is at the second position. That is, it is assumed that one minipixel 13 transitions from the state of being positioned in the right-eye visible regions 18R to the state of being positioned in the left-eye visible regions 18L. In this case, the controller 30 may be configured to change the image displayed on the minipixel 13 from the right-eye image to the left-eye image. When the viewpoint position of the user shifts from the first position to the second position, the controller 30 may be configured to change the image to be displayed on the minipixels 13_P7Ra and 13_P7Rb included in the sub-pixel 12_P7R from the right-eye image to the left-eye image, for example.

If the image displayed on some of the minipixels 13 included in one subpixel 12 is changed from a right-eye image to a left-eye image, the number of the plurality of minipixels 13 that continue to display the plurality of left-eye images is reduced. The controller 30 may increase the brightness of the plurality of minipixels 13 that continue to display the plurality of left-eye images. When changing the image to be displayed on the minipixels 13_P7Ra and 13_P7Rb included in the subpixel 12_P7R from the right-eye image to the left-eye image, for example, the controller 30 may be configured to control the gradation of the minipixel 13_P7Rc to increase the brightness of the image. By doing so, the brightness of the plurality of left-eye images displayed on the plurality of subpixels 12 can be kept constant. That is, the change in the brightness of the image can be reduced, and the balance of the brightness within each pixel 11 can be kept constant. As a result, the user is less likely to recognize the flicker due to the change in the viewpoint position.

Even when one minipixel 13 transitions from the state of being positioned in the left-eye visible regions 18L to the state of being positioned in the right-eye visible regions 18R, the controller 30 may be configured to control an image to be displayed on the minipixel 13 in the same manner as or similar to the above example.

The controller 30 is not limited to the above example and may be configured to arbitrarily control the image to be displayed on the minipixel 13 on the display panel 10 or the light transmittance of the barrier panel 20.

According to the display device 100 according to the present embodiment, the controller 30 is configured to control the image to be displayed on the display panel 10 in units of minipixels 13. In this case, as compared with the case where the controller 30 controls the image to be displayed on the display panel 10 in units of subpixels 12, crosstalk can be easily reduced, and the brightness of the image to be viewed by the user can be increased.

Example

The visible regions of the display surface 10A in the display device 100 according to the present embodiment will be described in detail with reference to FIGS. 5A and 5B. FIG. 5A is an example of a schematic view illustrating the visible regions of the left eye 5L at the first position on the display surface 10A. FIG. 5B is an example of a schematic view illustrating the visible regions of the left eye 5L at the second position on the display surface 10A. In the examples of FIGS. 5A and 5B, a case where the user views the left-eye images with the left eye 5L will be described as an example.

As illustrated in FIG. 5A, the plurality of left-eye visible regions 18L include six minipixels 13 configured to display R when the viewpoint position of the user is at the first position. The plurality of left-eye visible regions 18L include, for example, minipixels 13_P1Ra, 13_P1Rb, 13_P1Rc, 13_P2Ra, 13_P2Rb, and 13_P2Rc. When the viewpoint position of the user is at the first position, the plurality of left-eye visible regions 18L include six minipixels 13 configured to display G. The plurality of left-eye visible regions 18L include, for example, minipixels 13_P3Ga, 13_P3Gb, 13_P3Gc, 13_P4Ga, 13_P4Gb, and 13_P4Gc. When the viewpoint position of the user is at the first position, the plurality of left-eye visible regions 18L include six minipixels 13 configured to display B. The plurality of left-eye visible regions 18L include, for example, minipixels 13_P5Ba, 13_P5Bb, 13_P5Bc, 13_P6Ba, 13_P6Bb, and 13_P6Bc.

When the viewpoint position of the user is at the first position, the plurality of left-eye images may be displayed, for example, on the minipixels 13_P1Ra, 13_P1Rb, 13_P1Rc, 13_P2Ra, 13_P2Rb, 13_P2Rc, 13_P3Ga, 13_P3Gb, and 13_P3Gc. The plurality of left-eye images may be displayed, for example, on the minipixels 13_P4Ga, 13_P4Gb, 13_P4Gc, 13_P5Ba, 13_P5Bb, 13_P5Bc, 13_P6Ba, 13_P6Bb, and 13_P6Bc. When the viewpoint position of the user is at the first position, the left eye 5L of the user views the plurality of left-eye images displayed on minipixel 13 positioned in the plurality of left-eye visible regions 18L of the display panel 10 through the plurality of light-transmitting regions 20A of the barrier panel 20.

Specifically, when the viewpoint position of the user is at the first position, the left eye 5L of the user views 1/12 of the area of the minipixel 13_P1Ra as a left-eye image through the plurality of light-transmitting regions 20A of the barrier panel 20. The left eye 5L views 3/12 of the area of the minipixel 13_P1Rb as a left-eye image. The left eye 5L views 5/12 of the area of the minipixel 13_P1Rc as a left-eye image. The left eye 5L views 7/12 of the area of the minipixel 13_P2Ra as a left-eye image. The left eye 5L views 9/12 of the area of the minipixel 13_P2Rb as a left-eye image. The left eye 5L views 11/12 of the area of the minipixel 13_P2Rc as a left-eye image. The left eye 5L views the entire subpixels 12_P3G and P4G as a left-eye image. The left eye 5L views 11/12 of the area of the minipixel 13_P5Ba as a left-eye image. The left eye 5L views 9/12 of the area of the minipixel 13_P5Bb as a left-eye image. The left eye 5L views 7/12 of the area of the minipixel 13_P5Bc as a left-eye image. The left eye 5L views 5/12 of the area of the minipixel 13_P6Ba as a left-eye image. The left eye 5L views 3/12 of the area of the minipixel 13_P6Bb as a left-eye image. The left eye 5L views 1/12 of the area of the minipixel 13_P6Bc as a left-eye image.

On the other hand, as illustrated in FIG. 5B, when the viewpoint position of the user is at the second position, the plurality of left-eye visible regions 18L include six minipixels 13 configured to display R. The plurality of left-eye visible regions 18L include, for example, minipixels 13_P1Rc, 13_P2Ra, 13_P2Rb, 13_P2Rc, 13_P7Ra, and 13_P7Rb. When the viewpoint position of the user is at the second position, the plurality of left-eye visible regions 18L include six minipixels 13 configured to display G. The plurality of left-eye visible regions 18L include, for example, minipixels 13_P3Ga, 13_P3Gb, 13_P3Gc, 13_P4Ga, 13_P4Gb, and 13_P4Gc. When the viewpoint position of the user is at the second position, the plurality of left-eye visible regions 18L include six minipixels 13 configured to display B. The plurality of left-eye visible regions 18L include, for example, minipixels 13_P5Ba, 13_P5Bb, 13_P5Bc, 13_P6Ba, 13_P6Bb, and 13_P6Bc.

When the viewpoint position of the user is at the second position, a plurality of left-eye images are displayed on, for example, minipixels 13_P1Rc, 13_P2Ra, 13_P2Rb, 13_P2Rc, 13_P7Ra, and 13_P7Rb. The plurality of left-eye images are displayed, for example, on minipixels 13_P3Ga, 13_P3Gb, 13_P3Gc, 13_P4Ga, 13_P4Gb, and 13_P4Gc. The plurality of left-eye images are displayed, for example, on 13_P5Ba, 13_P5Bb, 13_P5Bc, 13_P6Ba, 13_P6Bb, and 13_P6Bc. Even when the viewpoint position of the user is at the second position, the left eye 5L of the user views a plurality of left-eye images displayed on the minipixels 13 positioned in the plurality of left-eye visible regions 18L of the display panel 10 through the plurality of light-transmitting regions 20A of the barrier panel 20.

Specifically, when the viewpoint position of the user is at the second position, the left eye 5L of the user views 1/12 of the area of the minipixel 13_P1Rc as a left-eye image through the plurality of light-transmitting regions 20A of the barrier panel 20. The left eye 5L views 3/12 of the area of the minipixel 13_P2Ra as a left-eye image. The left eye 5L views 5/12 of the area of the minipixel 13_P2Rb as a left-eye image. The left eye 5L views 7/12 of the area of the minipixel 13_P2Rc as a left-eye image. The left eye 5L views 9/12 of the area of the minipixel 13_P3Ga as a left-eye image. The left eye 5L views 11/12 of the area of the minipixel 13_P3Gb as a left-eye image. The left eye 5L views the entire minipixel 13_P3Gc as a left-eye image. The left eye 5L views the entire subpixel 12_P4G as a left-eye image. The left eye 5L views the entire minipixels 13_P5Ba and 13_P5Bb as a left-eye image. The left eye 5L views 11/12 of the area of the minipixel 13_P5Bc as a left-eye image. The left eye 5L views 9/12 of the area of the minipixel 13_P6Ba as a left-eye image. The left eye 5L views 7/12 of the area of the minipixel 13_P6Bb as a left-eye image. The left eye 5L views 5/12 of the area of the minipixel 13_P6Bc as a left-eye image. The left eye 5L views 3/12 of the area of the minipixel 13_P7Ra as a left-eye image. The left eye 5L views 1/12 of the area of the minipixel 13_P7Rb as a left-eye image.

According to the display device 100 according to the present embodiment, the controller 30 is configured to appropriately control the image to be displayed in units of minipixels 13 based on the viewpoint position of the user. By the controller 30 controlling the image in units of minipixels 13, even if the viewpoint position of the user shifts from the first position to the second position, the user can view a plurality of left-eye images with the left eye 5L without viewing a plurality of right-eye images with the left eye 5L. As a result, the display device 100 according to the present embodiment can increase the brightness of the image to be viewed by the user while reducing the crosstalk. In the examples of FIGS. 5A and 5B, the control when the user views a plurality of left-eye images with the left eye 5L has been described as an example, but the same or similar control can be performed when the user views a plurality of right-eye images with the right eye 5R.

The ratio of the vertical length to the horizontal length of each minipixel 13 that is a unit for displaying an image may be close to 1. The minipixel 13, which is a unit for displaying an image, is also called a display unit. The ratio of the vertical length to the horizontal length of each minipixel 13 is also referred to as the aspect ratio of the display unit.

It is assumed that the plurality of left-eye visible regions 18L and the plurality of right-eye visible regions 18R are adjacent to each other. The boundary between the plurality of left-eye visible regions 18L and the plurality of right-eye visible regions 18R may divide one display unit. In this case, in the area of one display unit, the area included in the left-eye visible regions 18L and the area included in the right-eye visible regions 18R may be halved respectively. The lower limit of the vertical length and the horizontal length of the display unit is determined based on the manufacturing cost or manufacturing technology of the display panel 10. When there is a lower limit of the vertical length and the horizontal length of the display unit, the area of the display unit can be reduced as the aspect ratio of the display unit approaches 1. That is, as the aspect ratio of the display unit approaches 1, the area of the left-eye image viewed by the right eye 5R can be reduced.

As illustrated in FIG. 7, a plurality of optical members may include the plurality of lenticular lenses 25. When the plurality of optical members are configured as the plurality of lenticular lenses 25, the plurality of optical members may include a plurality of cylindrical lenses 26 extending in the Y-axis direction and arranged in the X-axis direction. In this case, the plurality of cylindrical lenses 26 correspond to the plurality of optical elements 35.

The plurality of optical members configured as the plurality of lenticular lenses 25 can be configured to function in the same manner or similar to the plurality of optical members configured as the barrier panel 20. For example, the plurality of cylindrical lenses 26 as the plurality of optical elements 35 can be configured to function to allow the image light emitted from the plurality of left-eye image regions PgL of the display panel 10 to reach the left eye 5L of the user while preventing the image light from reaching or making the image light less likely to reach the right eye 5R. In this case, the image light can propagate along a path 52L represented by the broken line. On the other hand, the plurality of cylindrical lenses 26 as the plurality of optical elements 35 can be configured to function to allow the image light emitted from the plurality of right-eye image regions PgR of the display panel 10 to reach the right eye 5R of the user while preventing the image light from reaching or making the image light less likely to reach the left eye 5L. In this case, the image light can propagate along a path 52R represented by the alternate long and short dash line.

Application Example

Figure 8:
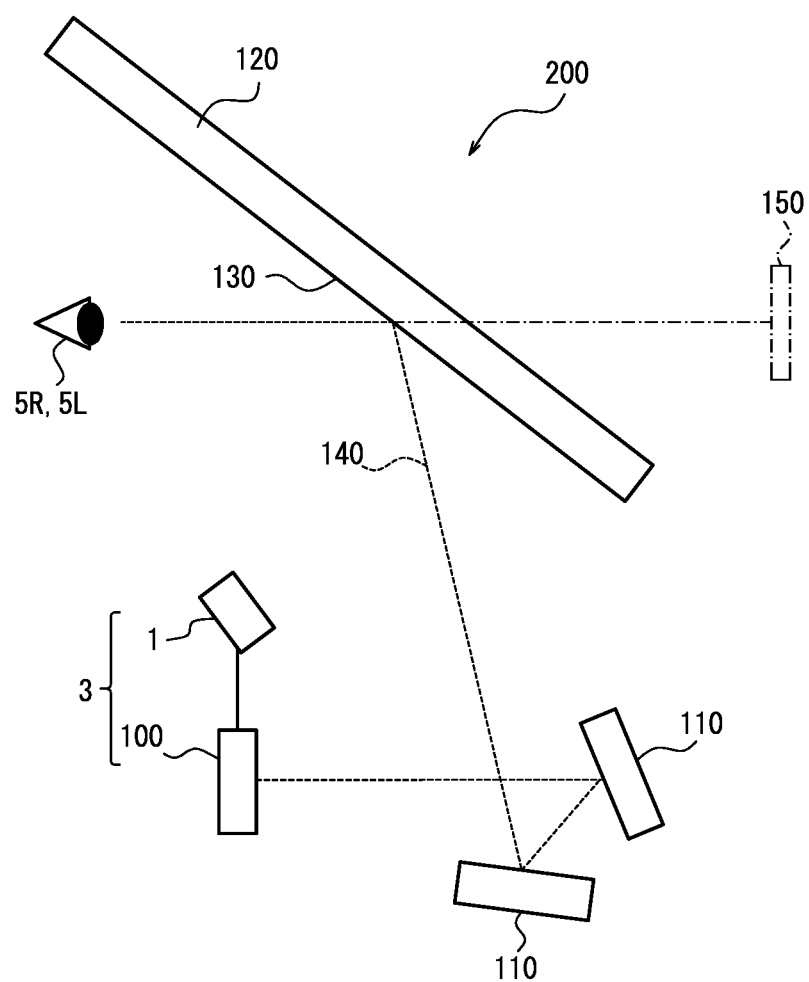
FIG. 8 is a view illustrating an example of a HUD on which the display device according to the embodiment is mounted.

As illustrated in FIG. 8, a three-dimensional display system 3 includes a position detection device 1 and a display device 100. As illustrated in FIG. 8, the three-dimensional display system 3 can be mounted on a head-up display (HUD) 200. The HUD 200 includes the three-dimensional display system 3, an optical system 110, and a projected member 120 having a projected surface 130. The HUD 200 is configured so that the image light emitted from the three-dimensional display system 3 reaches the projected member 120 via the optical system 110. That is, the HUD 200 is configured to project the image light onto the projected member 120. The HUD 200 is configured so that the image light reflected by the projected member 120 reaches the left eye 5L and right eye 5R of the user. That is, the HUD 200 is configured to allow the image light to travel from the three-dimensional display system 3 to the left eye 5L and right eye 5R of the user along an optical path 140 indicated by the broken line. The user can view the image light that has reached along the optical path 140 as a virtual image 150.

Figure 9:
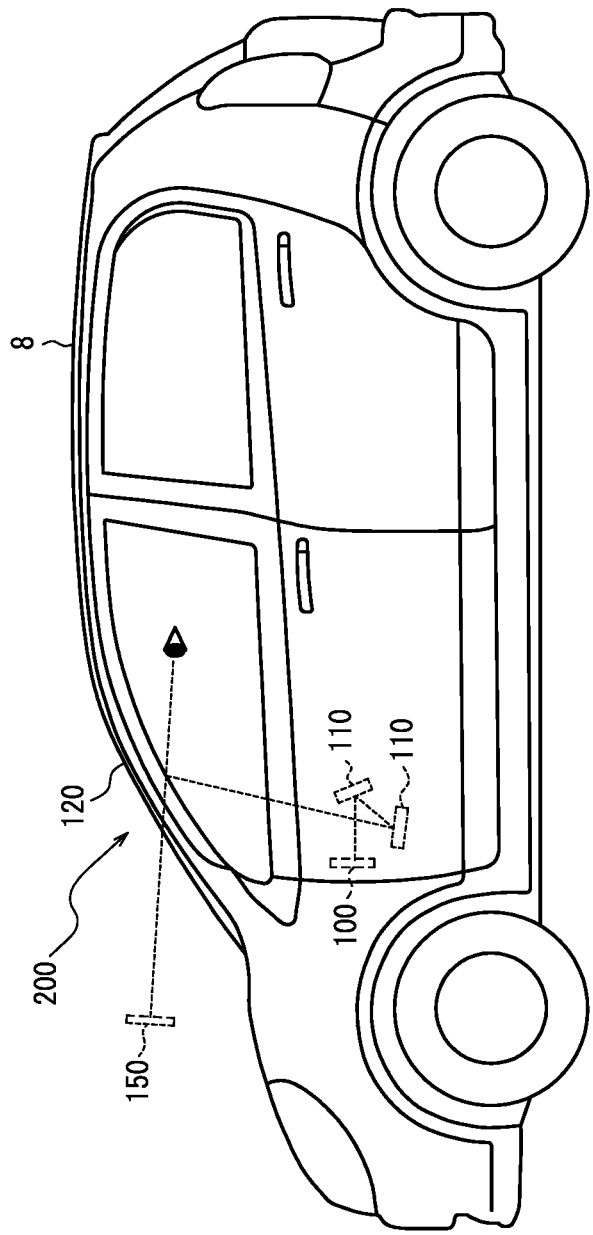
FIG. 9 is a view illustrating an example of a vehicle on which the HUD illustrated in FIG. 8 is mounted.

As illustrated in FIG. 9, the HUD 200 including the three-dimensional display system 3 may be mounted on a mobile object 8. A part of the configuration of the HUD 200 may be shared with other devices and parts included in the mobile object 8. For example, in the mobile object 8, a windshield may also be used as the projected member 120. A part of the HUD 200 and the three-dimensional display system 3 may be shared with other devices and parts included in the mobile object 8. When a part of the configuration is also shared with other device or parts included in the mobile object 8, the other configuration may be referred to as a HUD module or a three-dimensional display component. "Mobile objects" in the disclosure include vehicles, ships, and aircraft. "Vehicles" in the disclosure include, but are not limited to, automobiles and industrial vehicles and may include railway vehicles, living vehicles, and fixed-wing aircraft traveling on runways. Automobiles include, but are not limited to, passenger cars, trucks, buses, motorcycles, trolley buses, and the like and may include other vehicles traveling on the road. The industrial vehicles include industrial vehicles for agriculture and construction. The industrial vehicles include, but are not limited to, forklifts and golf carts. The industrial vehicles for agriculture include, but are not limited to, tractors, tillers, transplanters, binders, combines, and lawnmowers. The industrial vehicles for construction include, but are not limited to, bulldozers, scrapers, excavators, crane trucks, dump trucks, and road rollers. The vehicles include those that run manually. The classification of vehicles is not limited to those described above. For example, an automobile may include an industrial vehicle capable of traveling on a road and the same vehicle may be included in a plurality of classifications. The ships in the disclosure include marine jets, boats, and tankers. The aircraft in the disclosure includes fixed-wing aircraft and rotary-wing aircraft.

The three-dimensional display system 3 does not have to include the position detection device 1. If the three-dimensional display system 3 does not include the position detection device 1, the controller 30 may include an input terminal configured to receive a signal from a detection device outside the device. The detection device outside the device may be connected to the input terminal. The detection device outside the device may be configured to use an electrical signal and an optical signal as transmission signals to the input terminal. The detection device outside the device may be indirectly connected to the input terminal via a shared network. The controller 30 may be configured to receive position coordinates indicating the position of at least one of the left eye 5L and the right eye 5R acquired from the detection device outside the device. The controller 30 may be configured to calculate the distances of the movement of the left eye 5L and the right eye 5R along the horizontal direction based on the position coordinates.

Modification Example

In this embodiment, it has been assumed that the display device 100 displays a three-dimensional image. The display format of the display device 100 is not particularly limited. For example, the display device 100 may be configured to display a three-dimensional image on a part of the display surface 10A and display a two-dimensional image on the other part of the display surface 10A. For example, the display device 100 may be configured to display a three-dimensional image on the entire display surface 10A. For example, the display device 100 may be configured to display a two-dimensional image on the entire display surface 10A. The display panel 10 may be configured to display different images on each of the plurality of minipixels 13 included in the plurality of subpixels 12 configured to display a three-dimensional image. The display panel 10 may be configured to display the same image on the plurality of minipixels 13 included in the subpixel 12 configured to display a two-dimensional image. By doing so, the image quality of each of the three-dimensional image and the two-dimensional image can be improved.

In the present embodiment, the plurality of left-eye image regions PgL and the plurality of right-eye image regions PgR of the display panel 10 are repeatedly arranged in the horizontal direction. The plurality of left-eye image regions PgL and the plurality of right-eye image regions PgR of the display panel 10 are repeatedly arranged adjacent to each other at positions shifted by one subpixel 12 in the horizontal direction, in the vertical direction. The arrangement of the plurality of left-eye image regions PgL and the plurality of right-eye image regions PgR of the display panel 10 is not limited to these examples. For example, the plurality of left-eye image regions PgL and the plurality of right-eye image regions PgR of the display panel 10 may be repeatedly arranged in the horizontal direction and may be repeatedly arranged also in the vertical direction. In such a configuration, the barrier panel 20 may be configured to control the plurality of light-transmitting regions 20A and the plurality of dimming regions 20B so that image light from the plurality of minipixels 13 positioned in each of the plurality of left-eye image regions PgL and the plurality of right-eye image regions PgR of the display panel 10 is simultaneously transmitted or dimmed. Specifically, in the barrier panel 20, each pixel may have a size that allows image light from an image in size of one minipixel 13 to be transmitted so as to reach the position of any eye of the user. In such a configuration, the controller 30 is configured to control a plurality of pixels consecutive in the horizontal direction in a light-transmitting state. The controller 30 is configured to control the plurality of pixels consecutive in the horizontal direction in the light-transmitting state to be arranged so as to be shifted by the horizontal length of the plurality of pixels in the vertical direction.

In the present embodiment, a case where the barrier panel 20 is placed in front of the display panel 10 when viewed from the user has been described as an example. The placement of the barrier panel 20 may be appropriately changed according to the type of the display panel 10. For example, when the display panel 10 is a backlight-transmitting display panel, the barrier panel 20 may be placed in front of the display panel 10 when viewed from the user, or behind the display panel 10 when viewed from the user. For example, when the display panel 10 is a self-luminous display panel, the barrier panel 20 may be placed in front of the display panel 10 when viewed from the user.

In the present embodiment, the controller 30 is configured to change the minipixel 13 that displays the right-eye image and the left-eye image based on the position of the eyes of the user and the position of the region in a light-transmitting state, but the present embodiment is not limited thereto. For example, the position of the eyes of the user may be fixed. In such a configuration, the controller 30 is configured to change the minipixels 13 configured to display the plurality of right-eye images and the plurality of left-eye images based on the position of the region in a light-transmitting state. In this case, the display device 100 does not have to include the position detection device 1.

When the display device 100 includes the position detection device 1, the position detection device 1 is configured to detect the position of either the left eye 5L or right eye 5R of the user and output the position to the controller 30. The position detection device 1 may include, for example, a camera. The position detection device 1 may be configured to capture the face of the user with a camera. The position detection device 1 may be configured to detect the position of at least one of the left eye 5L and the right eye 5R from the image captured by the camera. The position detection device 1 may be configured to detect the position of at least one of the left eye 5L and the right eye 5R as coordinates in three-dimensional space from an image captured by one camera. The position detection device 1 may be configured to detect the position of at least one of the left eye 5L and the right eye 5R as coordinates in three-dimensional space from images captured by two or more cameras.

The position detection device 1 may not include a camera and may be connected to a camera outside the device. The position detection device 1 may include an input terminal configured to receive a signal from a camera outside the device. The camera outside the device may be directly connected to the input terminal. The cameras outside the device may be indirectly connected to the input terminal via a shared network. The position detection device 1 without a camera may include an input terminal configured to receive a video signal from a camera. The position detection device 1 without a camera may be configured to detect the position of at least one of the left eye 5L and the right eye 5R from the video signal inputted to the input terminal.

The position detection device 1 may include, for example, a sensor. The sensor may include an ultrasonic sensor, an optical sensor, or the like. The position detection device 1 may be configured to detect the position of the head of the user by a sensor. The position detection device 1 may be configured to detect the position of at least one of the left eye 5L and the right eye 5R based on the detected position of the head of the user. The position detection device 1 may be configured to detect the position of at least one of the left eye 5L and the right eye 5R as coordinates in three-dimensional space with one or two or more sensors.

The position detection device 1 may be configured to detect the distances of the movement of the left eye 5L and the right eye 5R along the direction in which the left eye 5L and the right eye 5R are aligned, based on the detection results of the position of at least one of the left eye 5L and the right eye 5R.

When the display device 100 includes an irradiator, the irradiator is placed on one surface side of the display panel 10 and is configured to irradiate the surface of the display panel 10. The irradiator may be configured to include a light source, and a light guide plate, a diffusion plate, a diffusion sheet, or the like. The irradiator is configured to emit irradiation light from a light source and to homogenize the irradiation light in the planar direction of the display panel 10 by a light guide plate, a diffusion plate, a diffusion sheet, or the like. The irradiator is configured to emit homogenized light towards the display panel 10.

In the display panel 10 according to an embodiment, each pixel 11 does not include the plurality of subpixels 12, but may include the plurality of minipixels 13. That is, the controller 30 may be configured to determine the color to be displayed on the plurality of minipixels 13 regardless of the color to be displayed in units of the subpixel 12. For example, the controller 30 may be configured to cause the minipixels 13 aligned in the horizontal direction to display the same color. The controller 30 may be configured to cause the minipixels 13 aligned in the vertical direction to display R, G, and B, respectively. For each pixel 11, the number of minipixels 13 configured to display R, G, and B may be different. By doing so, crosstalk can be reduced and the brightness of the parallax image that can be viewed by the user can be increased.

Although the above embodiments have been described as representative examples, it will be apparent to those skilled in the art that many modifications and substitutions can be made within the sense and scope of the disclosure. The configuration according to the disclosure should not be construed as being restricted by the embodiments described above, and various modifications or changes can be made without departing from the scope of the claims. For example, it is possible to combine the plurality of constituent blocks described in the embodiments and the examples into one, or to divide one constituent block.

The views for illustrating the configuration according to the disclosure are schematic. The dimensional ratios on the drawings do not always match the actual ones.

In the disclosure, the descriptions such as "first" and "second" are identifiers for distinguishing corresponding configurations. Configurations distinguished by the descriptions such as "first" and "second" in the disclosure can exchange numbers in the corresponding configurations. For example, the first eye can exchange the identifiers "first" and "second" with the second eye. The exchange of identifiers takes place at the same time. Even after exchanging identifiers, the corresponding configuration is distinguished. The identifier may be deleted. The configuration with the identifier deleted is distinguished by a reference numeral. It should not be used as a basis for interpreting the order of the corresponding configurations or the rationale for the existence of identifiers with lower numbers, based solely on the description of identifiers such as "first" and "second" in this disclosure.

In the disclosure, the X-axis, Y-axis, and Z-axis are provided for the convenience of explanation and may be interchanged with each other. The configuration according to the disclosure has been described using a Cartesian coordinate system composed of the X-axis, the Y-axis, and the Z-axis. The positional relationship of the respective configurations according to the disclosure is not limited to being in an orthogonal relationship.

Reference Signs List

1: Position detection device
3: Three-dimensional display system
8: Mobile object
10: Display panel
10A: Display surface
11: Pixel
12: Subpixel
13: Minipixel
20: Barrier panel
20A: Light-transmitting region
20B: Dimming region
25: Lenticular lens
26: Cylindrical lens
30: Controller
100: Display device
110: Optical system
120: Projected member
130: Projected surface
140: Optical path
150: Virtual image
200: Head-up display

The invention claimed is:

1. A display device, comprising:
   a display panel configured to display a parallax image comprising a first image to be viewed by a first eye of a user and a second image to be viewed by a second eye of the user; and
   an optical member comprising a plurality of optical elements arranged along a predetermined direction which comprises a component in a parallax direction of the first eye and the second eye,
   a beam direction of the parallax image being defined by the plurality of optical elements,
   the display panel comprising a plurality of subpixels including a plurality of minipixel,
   each of the minipixels included in the plurality of subpixels being configured to be able to display different images, such that at least one of the minipixels included in one of the subpixels is configured to be able to display the first image and at least one other of the minipixels included in the one of the subpixels is configured to be able to display the second image, and
   the at least one of the minipixels including in one of the subpixels is configured to be able to selectively change displaying the first image or the second image to change a boundary of the one of the subpixels.

2. The display device according to claim 1, further comprising:
   a controller configured to determine an image to be displayed on each of the minipixels.

3. The display device according to claim 2, wherein
   the controller is configured to determine an image to be displayed on each of the minipixels based on a viewpoint position of the user.

4. The display device according to claim 2, wherein
   the plurality of subpixels comprise a first minipixel and a second minipixel, and
   the controller is configured to cause the first mini pixel to display the first image and cause the second minipixel to display the second image.

5. The display device according to claim 2, wherein
when an image to be displayed on a predetermined minipixel included in the plurality of subpixels is changed to a different image,
the controller controls gradations of minipixels other than the predetermined minipixel included in the plurality of subpixels.

6. The display device according to claim 2, wherein
the controller is configured to cause a predetermined minipixel to display a black image when the controller does not allow the first image and the second image to be displayed on each of the minipixels.

7. The display device according to claim 2, wherein
the controller is configured to cause a part of the display panel to display a three-dimensional image, and
the controller is configured to cause another part of the display panel to display a two-dimensional image.

8. A three-dimensional display system, comprising:
a position detection device that detects positions of eyes of a user; and
a three-dimensional display device,
the three-dimensional display device comprising
a display panel configured to display a parallax image comprising a first image to be viewed by a first eye of the user and a second image to be viewed by a second eye of the user, and
an optical member comprising a plurality of optical elements arranged along a predetermined direction which comprises a component in a parallax direction of the first eye and the second eye,
a beam direction of the parallax image being defined by the plurality of optical elements,
the display panel comprising a plurality of subpixels including a plurality of minipixel,
each of the minipixels included in the plurality of subpixels being configured to be able to display different images, such that at least one of the minipixels included in one of the subpixels is configured to be able to display the first image and at least one other of the minipixels included in the one of the subpixels is configured to be able to display the second image, and
the at least one of the minipixels including in one of the subpixels is configured to be able to selectively change displaying the first image or the second image to change a boundary of the one of the subpixels.

9. A head-up display, comprising:
a three-dimensional display device; and
a projected member comprising a projected surface,
the three-dimensional display device comprising
a display panel configured to display a parallax image comprising a first image to be viewed by a first eye of a user and a second image to be viewed by a second eye of the user, and
an optical member comprising a plurality of optical elements arranged along a predetermined direction which comprises a component in a parallax direction of the first eye and the second eye,
a beam direction of the parallax image being defined by the plurality of optical elements,
the display panel comprising a plurality of subpixels including a plurality of minipixel,
each of the minipixels included in the plurality of subpixels being configured to be able to display different images, such that at least one of the minipixels included in one of the subpixels is configured to be able to display the first image and at least one other of the minipixels included in the one of the subpixels is configured to be able to display the second image,
the at least one of the minipixels including in one of the subpixels is configured to be able to selectively change displaying the first image or the second image to change a boundary of the one of the subpixels, and
the three-dimensional display device being configured to project the first image and the second image on the projected surface and allow the user to view the first image and the second image through the projected surface.

10. A mobile object comprising:
a three-dimensional display device; and
a projected member comprising a projected surface,
the three-dimensional display device comprising
a display panel configured to display a parallax image comprising a first image to be viewed by a first eye of a user and a second image to be viewed by a second eye of the user, and
an optical member comprising a plurality of optical elements arranged along a predetermined direction which comprises a component in a parallax direction of the first eye and the second eye,
a beam direction of the parallax image being defined by the plurality of optical elements,
the display panel comprising a plurality of subpixels including a plurality of minipixel,
each of the minipixels included in the plurality of subpixels being configured to be able to display different images, such that at least one of the minipixels included in one of the subpixels is configured to be able to display the first image and at least one other of the minipixels included in the one of the subpixels is configured to be able to display the second image,
the at least one of the minipixels including in one of the subpixels is configured to be able to selectively change displaying the first image or the second image to change a boundary of the one of the subpixels, and
the three-dimensional display device being configured to project the first image and the second image on the projected surface and allow the user to view the first image and the second image through the projected surface.

* * * * *